United States Patent
Woodill, Jr. et al.

(10) Patent No.: US 10,369,964 B2
(45) Date of Patent: Aug. 6, 2019

(54) KEYLESS ENTRY SYSTEM SECURITY ENHANCEMENT

(71) Applicant: The MITRE Corporation, McLean, VA (US)

(72) Inventors: John Robert Woodill, Jr., McLean, VA (US); Alberto Rolla Papaleo, McLean, VA (US); Robert Perry Engle, McLean, VA (US); Richard Joseph Pietravalle, McLean, VA (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 15/867,421

(22) Filed: Jan. 10, 2018

(65) Prior Publication Data

US 2018/0194323 A1    Jul. 12, 2018

Related U.S. Application Data

(60) Provisional application No. 62/444,692, filed on Jan. 10, 2017.

(51) Int. Cl.
*B60R 25/24* (2013.01)
*G07C 9/00* (2006.01)
*H04W 12/00* (2009.01)
*H04L 29/06* (2006.01)
*H04W 12/06* (2009.01)
*H04W 4/80* (2018.01)
*H04W 4/40* (2018.01)

(52) U.S. Cl.
CPC ............ *B60R 25/24* (2013.01); *G07C 9/00* (2013.01); *G07C 9/00309* (2013.01); *H04L 63/0853* (2013.01); *H04W 12/00* (2013.01); *H04W 12/06* (2013.01); *G07C 2009/00793* (2013.01); *G07C 2209/14* (2013.01); *H04L 2463/082* (2013.01); *H04W 4/40* (2018.02); *H04W 4/80* (2018.02)

(58) Field of Classification Search
CPC ............................. B60R 25/24; B60R 25/241
See application file for complete search history.

(56) References Cited

U.S. PATENT DOCUMENTS

2007/0290792 A1* 12/2007 Tsuchimochi ...... B60R 25/2072 340/5.61
2017/0305368 A1* 10/2017 Markham ............... H04W 4/40
2017/0366521 A1* 12/2017 Lei ..................... H04L 63/0236
2018/0015905 A1*  1/2018 Yorke ..................... B60R 25/24

* cited by examiner

*Primary Examiner* — Curtis B Odom
(74) *Attorney, Agent, or Firm* — Morrison & Foerster LLP

(57) ABSTRACT

The keyless entry system (KES) controls access to a vehicle's doors, trunk, hood, etc., through a keyless entry device (e.g., a key fob) using wireless communication with the vehicle. The technology described here mitigates vulnerabilities in the KES implementation by employing a device configured to suppress a keyless entry command until an additional means of authentication is verified, at which point the keyless entry command is unsuppressed.

29 Claims, 5 Drawing Sheets

KEYLESS ENTRY SYSTEM SECURITY ENHANCEMENT

CROSS-REFERENCE TO RELATED APPLICATION

This application claims the benefit of U.S. Provisional Application No. 62/444,692, filed on Jan. 10, 2017, the entire contents of which is incorporated herein by reference.

FIELD OF THE DISCLOSURE

This disclosure relates generally to enhancing the security of a keyless entry system implemented by a vehicle. More specifically, this disclosure relates to systems and methods that can deny unauthorized keyless commands from unlocking the vehicle while still allowing the vehicle to be eventually unlocked by an authorized user.

BACKGROUND OF THE DISCLOSURE

A modern car includes multiple electronic control units and numerous sensors to make the car safer, faster, and more efficient. This, however, can come at the cost of a cyber threat attack surface that grows by the day. The new technologies that are continually added to the modern car are often vulnerable to those with malicious intent.

Research has revealed that certain vehicles (e.g., specific makes and models of cars) outfitted with keyless entry systems are vulnerable to Keyless Entry System (KES) attacks. This vulnerability enables anyone with a computer, special software, and a digital radio receiver tuned to the correct frequency to listen for and retransmit wirelessly-transmitted codes that would unlock the doors of particular vehicles. With this in mind, additional measures need to be taken to secure the vehicle.

SUMMARY OF THE DISCLOSURE

As discussed above, keyless entry systems implemented in current vehicles have security vulnerabilities that can be exploited by unauthorized users. To address these vulnerabilities, the present disclosure is directed to a method of authenticating a keyless entry request using one or more means of authentication. The method dictates that a remote or proximity-related command (such as "unlock driver door") will be actively suppressed until the one or more means of authentication has been confirmed.

In some embodiments, a method for enhancing security of a keyless entry system of a vehicle includes: receiving a keyless entry command at a first device, the keyless entry command executable by the keyless entry system; upon receiving the keyless entry command, suppressing the keyless entry command to prevent the keyless entry system from executing the keyless entry command; receiving authentication information from a second device; and upon verifying the authentication information against stored information, permitting the keyless entry system to execute the keyless entry command.

In some embodiments, the method includes querying the second device to provide the authentication information.

In some embodiments, suppressing the keyless entry command includes transmitting a message on a vehicle bus, wherein the message conforms to a communication protocol of the vehicle bus.

In some embodiments, suppressing the keyless entry command includes transmitting a message on a vehicle bus to trigger an error in the keyless entry system.

In some embodiments, the keyless entry system is configured to control one or more doors, and the keyless entry command includes a command to unlock the one or more doors.

In some embodiments, suppressing the keyless entry command includes: transmitting a message on a vehicle bus to lock the one or more doors.

In some embodiments, suppressing the keyless entry command includes: controlling an electronic switch to disconnect the one or more doors from the keyless entry system.

In some embodiments, the first device includes an Electronic Control Unit (ECU) in the keyless entry system.

In some embodiments, the first device is configured to be connected to an on-board diagnostic (OBD) port of a vehicle.

In some embodiments, the authentication information is received over a Bluetooth wireless communications channel.

In some embodiments, the authentication information is received over a WiFi communications channel.

In some embodiments, the authentication information is received over a cellular communications channel.

In some embodiments, the authentication information provides a notification that the second device is located proximally to the vehicle configured with the keyless entry system.

In some embodiments, the authentication information includes first authentication information received from the second device, and the method includes: receiving second authentication information from a third device; verifying the first authentication and the second authentication against stored authentication information; and upon verifying the first and the second authentication information, permitting the keyless entry system to execute the keyless entry command.

In some embodiments, a system for enhancing security of a keyless entry system of a vehicle, includes: a first device including one or more processors; and memory storing instructions executable by the one or more processors to cause: receiving a keyless entry command at the first device, the keyless entry command executable by the keyless entry system; upon receiving the keyless entry command, suppressing the keyless entry command to prevent the keyless entry system from executing the keyless entry command; receiving authentication information from a second device; and upon verifying the authentication information against stored information, permitting the keyless entry system to execute the keyless entry command.

In some embodiment, the instructions are further executable by the one or more processors to cause: querying the second device to provide the authentication information.

In some embodiment, the instructions are further executable by the one or more processors to cause suppressing the keyless entry command by transmitting a message on a vehicle bus, wherein the message conforms to a communication protocol of the vehicle bus.

In some embodiment, the instructions are further executable by the one or more processors to cause suppressing the keyless entry command by transmitting a message on a vehicle bus to trigger an error in the keyless entry system.

In some embodiment, the keyless entry system is configured to control one or more doors, and the keyless entry command includes a command to unlock the one or more doors.

In some embodiment, the instructions are further executable by the one or more processors to cause suppressing the keyless entry command by transmitting a message on a vehicle bus to lock the one or more doors.

In some embodiment, the instructions are further executable by the one or more processors to cause suppressing the keyless entry command by controlling an electronic switch to disconnect the one or more doors from the keyless entry system.

In some embodiment, the first device includes an Electronic Control Unit (ECU) in the keyless entry system.

In some embodiment, the first device is configured to be connected to an on-board diagnostic (OBD) port of a vehicle.

In some embodiment, the authentication information is received over a Bluetooth wireless communications channel.

In some embodiment, the authentication information is received over a WiFi communications channel.

In some embodiment, the authentication information is received over a cellular communications channel.

In some embodiment, the authentication information provides a notification that the second device is located proximally to the vehicle configured with the keyless entry system.

In some embodiment, the authentication information includes first authentication information received from the second device, and the instructions are further executable by the one or more processors to cause: receiving second authentication information from a third device; verifying the first authentication and the second authentication against stored authentication information; and upon verifying the first and the second authentication information, permitting the keyless entry system to execute the keyless entry command.

In some embodiment, a non-transitory computer-readable storage medium includes instructions for enhancing security of a keyless entry system of a vehicle, and the instructions, when executed by a device having one or more processors, cause the one or more processors to perform instructions including: receiving a keyless entry command at a first device, the keyless entry command executable by the keyless entry system; upon receiving the keyless entry command, suppressing the keyless entry command to prevent the keyless entry system from executing the keyless entry command; receiving authentication information from a second device; and upon verifying the authentication information against stored information, permitting the keyless entry system to execute the keyless entry command.

BRIEF DESCRIPTIONS OF THE DRAWINGS

Figure 3B:
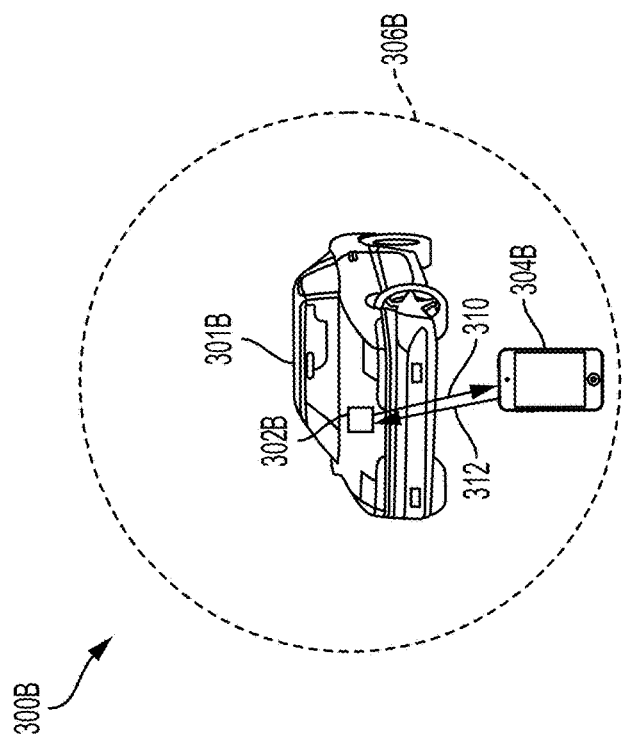
Figure 3A:
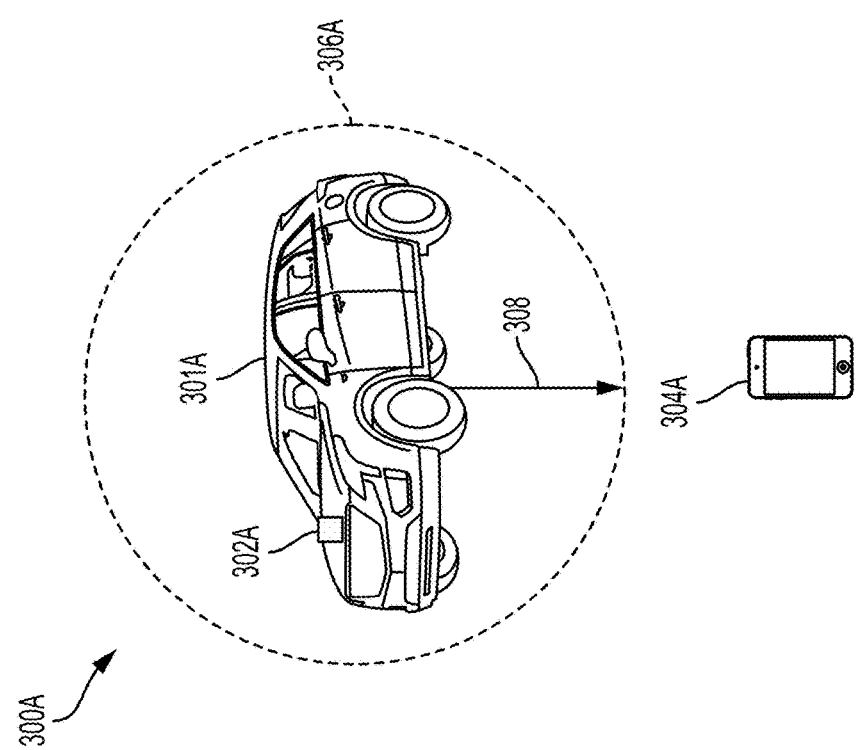

FIGS. 3A-B illustrate diagrams hat show how proximity information can be used as authentication information, according to some embodiments.

Figure 4:
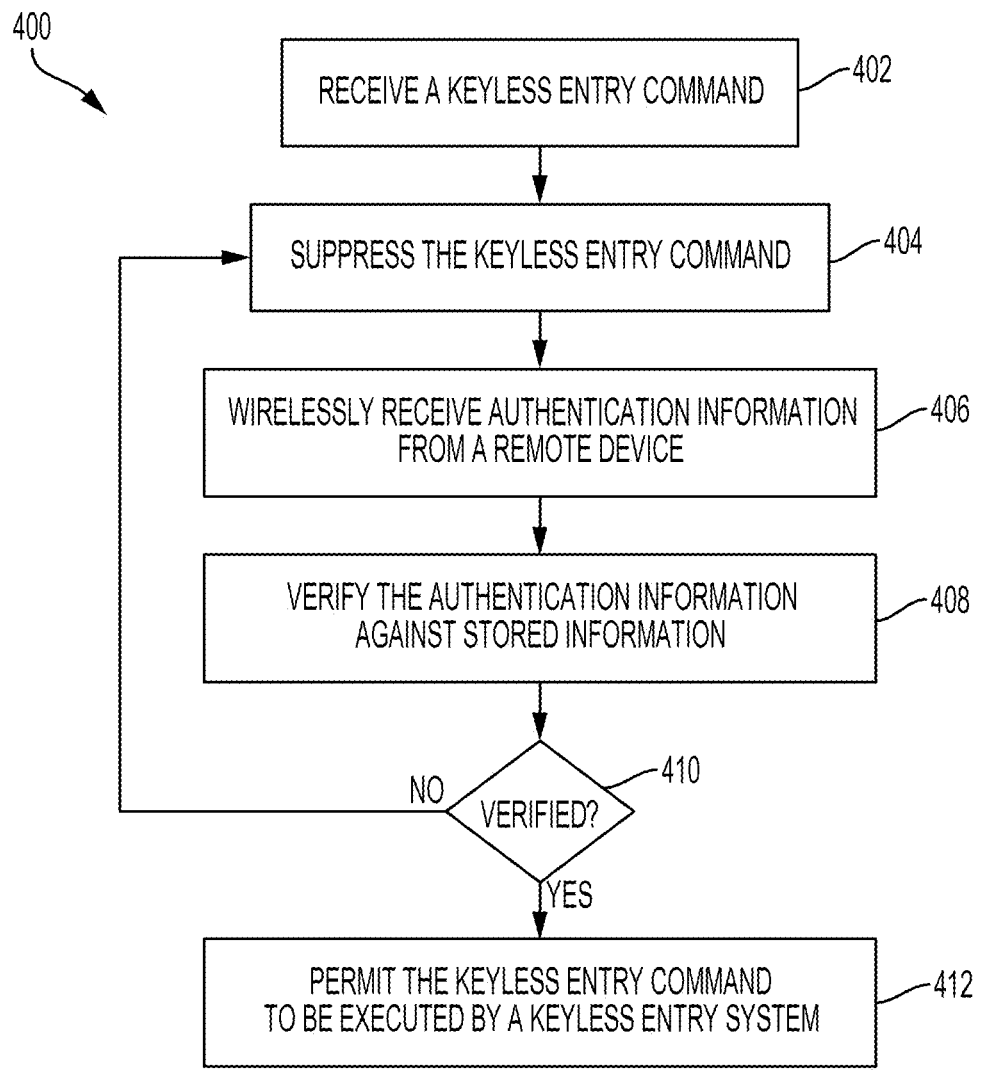

FIG. 4 illustrates a method for enhancing the security of a keyless entry system, according to some embodiments.

Figure 5:
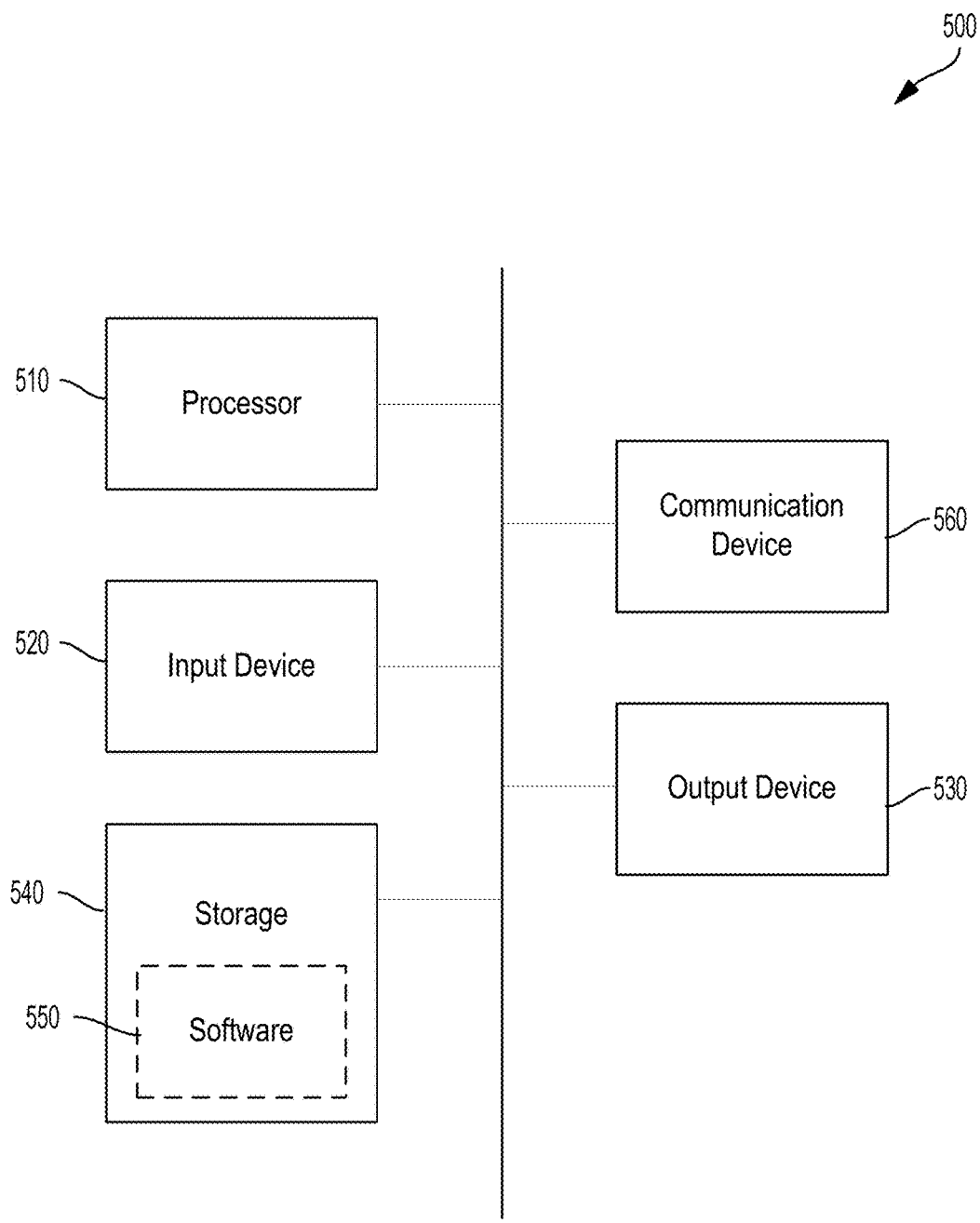

FIG. 5 illustrates an example of a computing device in accordance with one embodiment.

DETAILED DESCRIPTION

Modern vehicles, particularly automobiles, can utilize wireless signals from a keyless entry remote to unlock a vehicle through a keyless entry system (KES). In particular, the KES may unlock the vehicle once the KES verifies that a wireless signal from the keyless entry remote corresponds to an authorized unlock code. However, such a KES can be vulnerable to attack and exploitation from malicious, unauthorized third parties who seek to gain unauthorized entry into the vehicle. For example, an unauthorized user may gain unauthorized access to modern vehicles by exploiting a vulnerability of the KES through an attack called "RollJam" or through an "amplification attack."

A RollJam attack refers to a type of attack in which the unauthorized user operates a device to intercept communications between the keyless entry remote and a target vehicle. As the user (i.e., authorized user of the vehicle) attempts to unlock the vehicle, the unauthorized user can capture a first wireless signal (including a first unlock code) transmitted by the keyless entry remote (e.g., a key fob) while preventing the wireless signal from arriving at the vehicle. The authorized user may operate the keyless entry remote to transmit a second wireless signal including a second unlock command, and the unauthorized user can record the second wireless signal including the second unlock command, thereby giving the unauthorized user two unlock commands. In these types of attacks, the unauthorized user may replay (i.e., re-transmits) the first unlock command to unlock the vehicle and retain the unused second unlock command to replay later.

In an amplification attack, the unauthorized user may amplify a wireless signal transmitted by the keyless entry remote to make it appear that the keyless entry remote is within physical proximity to the vehicle. This signal amplification may simulate an authorized user attempting to gain physical entry to the vehicle. The unauthorized user may then be able to open the vehicle despite not having the keyless entry remote (e.g., a key fob) in hand. These attacks can require a computer, such as a single-board-computer (SBC) like an Arduino, a Raspberry Pi, or a Beaglebone with a software-defined-radio (SDR) supporting the frequency range used by the KES.

As described above, current keyless entry systems (KES) typically only require one authentication method, i.e., receiving and verifying a wireless command from a keyless entry remote, before granting entry within the KES. This implementation makes the current KES vulnerable to keyless entry system attacks such as "RollJam" and amplification attacks discussed above. Described are systems and methods for enhancing the security of keyless entry systems (KES) in automobiles to thwart such keyless entry system attacks. In some embodiments, a method operates by suppressing a wireless command transmitted by a keyless entry device (e.g., a key fob) from being executed by the KES until a user of the keyless entry device can be authenticated using at least one additional authentication method that requires a separate device. Therefore, an unauthorized user that utilizes, for example, "RollJam" and amplification attacks cannot gain entry within the KES because the unauthorized user does not have access to the separate device nor the at least one additional authentication method implemented by the separate device.

The discussion below utilizes the example of keyless entry systems associated with vehicles. For example, such vehicles may include private vehicles, but also commercial and heavy vehicles (heavy trucks, tractor trailers, construction vehicles). However, the present disclosure should not be seen as limiting and could be applicable to other types of non-vehicle related keyless entry systems such as residential security systems.

Figure 1:
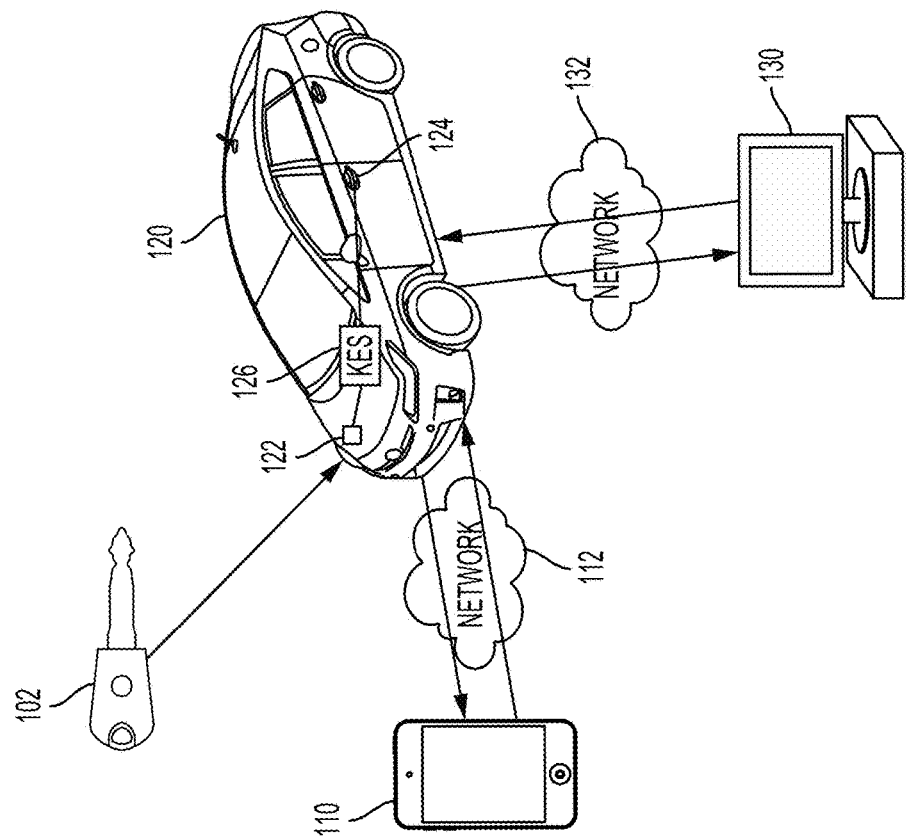
FIG. 1 illustrates a system for providing vehicle authentication to enhance security of a keyless entry system, according to some embodiments.

FIG. 1 illustrates an exemplary system 100 for providing vehicle authentication to enhance security of a keyless entry system (KES) 126, according to some embodiments. System 100 includes a keyless entry remote 102 (e.g., a key fob) that can be operated by a user to issue a wireless signal to KES 126 in vehicle 120 to unlock one or more doors 124 of vehicle 120. In some embodiments, keyless entry remote 102 can be a device operated by the user to transmit a wireless signal to start the ignition for vehicle 120. In some embodiments, as will be further described below, system 100 may include a mobile device 110, (e.g., a mobile phone) or a computing device 130 (e.g., a personal computer or a server) for communicating with vehicle 120 to enhance security of KES 126.

In some embodiments, to remedy the vulnerabilities of current KES, system 100 can include an authentication device 122 that requires at least a second method of authentication before permitting KES 126 to unlock doors 124. As will be further described with respect to FIG. 2, authentication device 122 can be implemented as a separate device coupled to KES 126, according to some embodiments. In other embodiments, authentication device 122 can be implemented as a component within KES 126. In some embodiments, authentication device 122 may require a plurality of authentication methods to be satisfied before permitting KES 126 to unlock doors 124. Should the required one or more methods of authentication not be satisfied, authentication device 122 can be configured to actively suppress an unlock command to prevent KES 126 from unlocking one or more doors 124 of vehicle 120.

In some embodiments, KES 126 in combination with authentication device 122 may implement multi-factor authentication for increasing the security of KES 126. Multi-factor authentication is a mechanism for verification of a person's identity who wants to gain access to information, an online account, or a device. In some embodiments, multi-factor authentication requires two or more of the following types of authentication mechanisms: knowledge of a single piece of information, such as a password ("something they know"); possession of an object, such as a digital token or a cell phone ("something they have"); having a unique physical characteristic, such as a fingerprint, an eye scan, or other biometrics ("something they are"); and a behavioral characteristic such as a walking gait ("something they can do").

In some embodiments, each of the plurality of authentication methods implemented by KES 126 may be selected from one of the above types of authentication mechanisms used in multi-factor authentication. In some embodiments, the plurality of authentication methods (including the second method of authentication) may further include a restricted time for enabling keyless entry remote 102 to successfully unlock doors 124.

When applied to the context of unlocking vehicle 120, the user would not only be required to provide the item he has, e.g., keyless entry remote 102, to remotely open one or more doors 124 of vehicle 120, but also the user would be required to provide one or more additional pieces of information or item to prove his or her identify. Authenticating the one or more additional pieces of information may be performed by authentication device 122. Therefore, KES 126 and authentication device 122 would, as a whole, require at least two methods of authentication to be verified before permitting the user to gain access to vehicle 120, thus rendering KES 126 less vulnerable to external attacks.

In some embodiments, authentication device 122 can permit KES 126 to unlock doors 124 upon keyless entry remote 102 transmitting a wireless signal corresponding to an authorized unlock command (e.g., an example of possession of an object) and upon receiving information from a separate device (e.g., mobile device 110 or computing device 130) to satisfy the second method of authentication discussed above. In some embodiments, the separate device may be a remote device (e.g., that is not physically coupled to KES 126 or vehicle 120) that can wirelessly communicate with authentication device 122. In some embodiments, the separate device may be a local device that is physically coupled to KES 126. For example, the local device may be an input device (e.g., a keypad) connected to one or more doors 124. In this example, in addition to receiving the wireless signal for an authorized unlock command, the second method of authentication may require that the user operating keyless entry remote 102 also enter a correct input (e.g., a pin number) into the input device.

In some embodiments, authentication device 122 implements a plurality of authentication methods and may require a plurality of pieces of authentication information from the separate device (e.g., one of mobile device 110 and computing device 130), or one or more pieces of authentication information from two or more separate devices (e.g., each of mobile device 110 and computing device 130).

In some embodiments, as shown in system 100, mobile device 110 may be a portable device (separate from keyless entry remote 102) capable of two-way wireless communication with authentication device 122 via network 112. In some embodiments, mobile device 110 may be possessed by the user of keyless entry remote 102. For example, mobile device 110 may be a smart watch, a smart phone, a separate remote control device, a tablet, smart glasses, etc. In some embodiments, network 112 may implement one or more wireless protocols such as Bluetooth, Zigbee, WiFi, WiMax, 3G, LTE, etc.

In some embodiments, computing device 130 may similarly be capable of two-way wireless communication with authentication device 122 via network 132. Computing device 130 may be a server, a laptop, or a computer located remotely from authentication device 122. In some embodiments, computing device 130 may be operated by the user of keyless entry remote 102. In other embodiments, computing device 130 may be operated by a different entity (e.g., a different user) to control whether to authorize the user of keyless entry remote 102 can unlock doors 124 of vehicle 120. These embodiments could be useful in fleet management scenarios.

For example, vehicle 120 may be a rental car owned by a car rental company. To further enhance the security of KES 126, when the user of keyless entry remote 102 tries to unlock doors 124, computing device 130 operated by an individual of the car rental company may be queried to grant access. In this example, computing device 130 may be a centralized server that manages the authorization of access to vehicle 120 and may additional log and report any unlock command attempts.

In some embodiments, network 132 includes cellular communication (e.g., LTE or 3G) that allows computing device 130 remotely located from vehicle 120 to communicate with authentication device 122 in vehicle 120. In some embodiments, network 132 may implement one or more wireless protocols such as Bluetooth, Zigbee, WiFi, WiMax, 3G, LTE, etc.

In one example, the user of keyless entry remote 102 may press an unlock button in an attempt to unlock doors 124 of vehicle 120. However, rather than unlocking doors 124, KES 126 may be prevented by authentication device 122 from operating. In particular, upon detecting an unlock attempt by keyless entry remote 102, authentication device 122 may temporary halt an unlock command from being processed by KES 126, as will be further described with respect to FIG. 2. Instead, authentication device 122 may query a separate device, such as mobile device 110, over network 112 (e.g., a wireless protocol such as Bluetooth or WiFi) to provide additional authentication information. In some embodiments, only after authentication device 122 receives and verifies the authentication information received from mobile device 110 will authentication device 122 allow KES 126 to unlock doors 124. If verification of the received authentication fails, authentication device 122 can be configured to interfere with the functionality of KES 126 such that doors 124 remain locked.

In some embodiments, the authentication information provided by mobile device 110 (or computing device 130) may be one of the types of authentication mechanisms described above with respect to multi-factor authentication. Examples of the "something they know" authentication mechanisms may include authentication device 122 querying the user of mobile device 110 to input a password. The password may be a plurality of numbers, a plurality of alphanumeric characters, a pattern or gesture drawn on a screen of mobile device 110, and the like. Examples of the "something they have" authentication mechanisms may include authentication device 122 that may wirelessly transmit a message to and wait for a corresponding response from mobile device 110 to determine whether mobile device 110 is in close physical proximity. This wireless transmission and receipt of a corresponding response is a mechanism that may be referred to as a "ping." Alternatively, authentication device 122 may be configured to query mobile device 110 to display an option to the user of mobile device 110 to "allow" or "disallow" the keyless entry attempt from keyless entry remote 102. If the user of mobile device 110 also initiated the keyless entry attempt, the user may input and transmit the "allow" command from mobile device 110 back to authentication device 122. Examples of the "something they are" authentication mechanisms may include authentication device 122 requesting mobile device 110 to provide specific biometric information. For example, mobile device 110 may be configured to request the user of mobile device 110 to input a fingerprint or an iris scan, etc.

Figure 2:
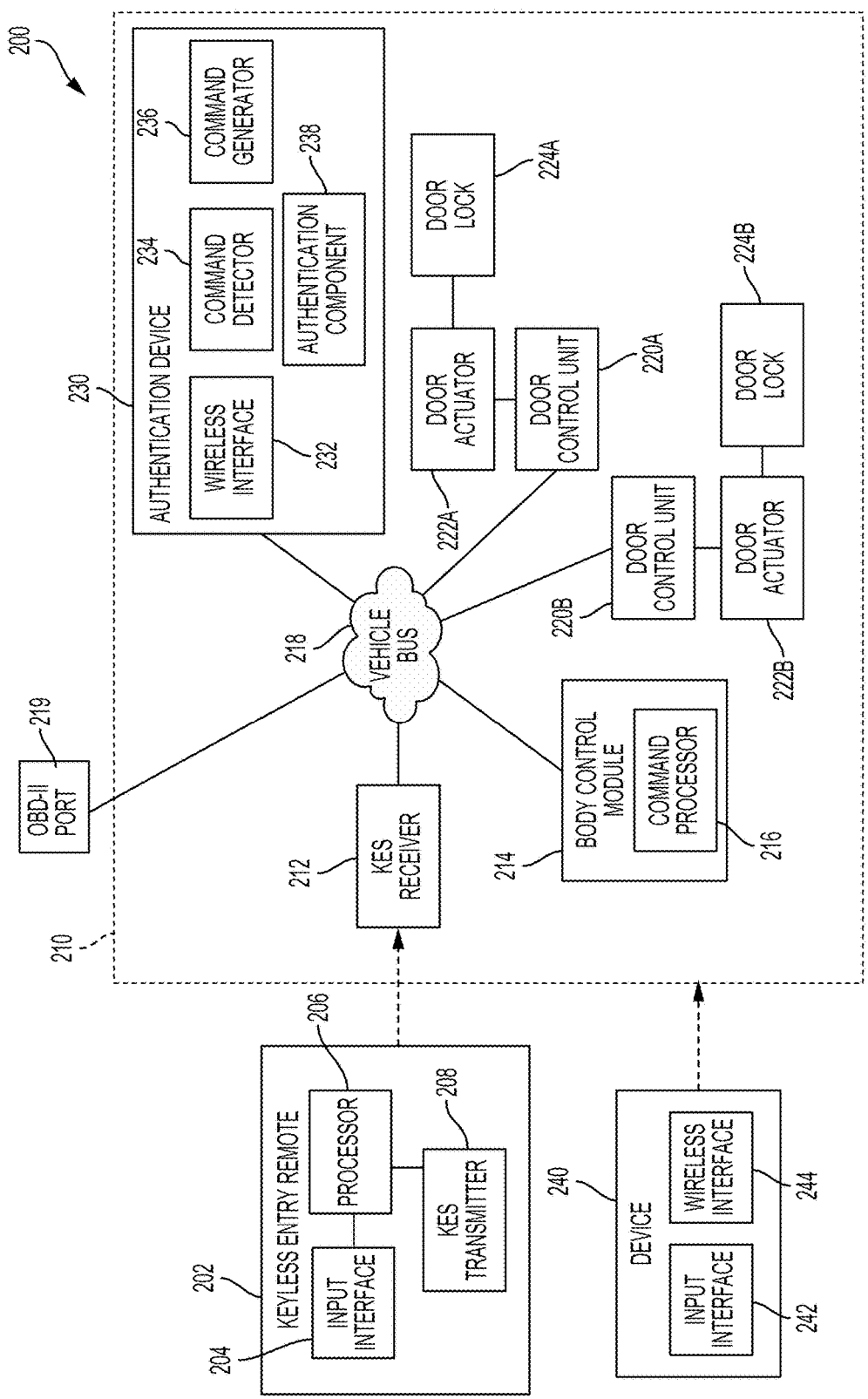
FIG. 2 illustrates a system for enhancing the security of a keyless entry system, according to some embodiments.

FIG. 2 illustrates a system 200 for enhancing the security of a keyless entry system, according to some embodiments. System 200 includes a keyless entry remote 202, a separate device 240, and a keyless entry system 210. In some embodiments, system 200 may be an example implementation of system 100, as described with respect to FIG. 1. The components of system 200 may correspond to the similarly named components of system 100.

In some embodiments, keyless entry remote 202 includes an input interface 204, a processor 206, and a KES transmitter 208. Input interface 204 may include a mechanical button, a touch screen, a switch, etc. that allows the user of keyless entry remote 206 to enter a keyless entry command. Upon receiving the input from input interface 204, processor 206 may be configured to generate an unlock code capable of being verified by KES 210 to process the keyless entry command, e.g., to unlock one or more doors of a vehicle. KES transmitter 208 may be configured to wirelessly transmit the unlock code to KES 210 via one or more RF frequencies. In some embodiments, processor 206 may be configured to implement an algorithm to generate rolling unlock codes such that a different unlock code is generated each time processor 206 receives an input from input interface 204. As noted above, such an algorithm may be susceptible to a "RollJam" attack.

Most modern vehicles include a plurality of Electronic Control Units (ECUs) that communicate with each other on a vehicle bus (e.g., a Controller Area Network bus) to control the one or more mechanical systems or one or more electrical systems in the vehicle. These ECUs may include, for example, an engine control unit, a door control unit, a body control module, a transmission control unit, a brake control module, etc. Each ECU may include a processor (e.g., a microcontroller), memory (e.g., SRAM, EEPROM, or flash, etc.), inputs (e.g., voltage, and digital or analog inputs), and outputs (e.g., logical outputs or various drivers). In the present disclosure, a vehicle bus refers to a communications network within the vehicle that communicatively interconnects components (e.g., ECUs or mechanical components) of the vehicle. The specific type technology or protocol implemented on the vehicle bus may depend on the intended use of the vehicle, a type of the vehicle, or safety requirements. For example, most automobiles include a vehicle bus that implements either a Controller Area Network (CAN) protocol or a Local Interconnect Network (LIN). Vehicles such as aircraft may implement other computer networking technologies such as Ethernet and TCP/IP.

In some embodiments, KES 210 of the vehicle may include the following ECUs: body controller module 214 and door control units 220A-B. Body controller module 214 can be configured to monitor and control various electronic accessories in the vehicle including one or more of door control units 220A-B to lock or unlock one or more doors of the vehicle. In some embodiments, KES 210 includes KES receiver 212 that is a radio receiver capable of receiving wireless signals transmitted by keyless entry remote 202. As discussed above, a wireless signal may include an unlock code associated with a command for keyless entry of the vehicle.

In some embodiments, KES receiver 212 receives the raw RF frequencies of the wireless signal and generates a digital signal including the unlock code represented by the wireless signal. KES receiver 212 may transmit the generated unlock code to body controller module 214. In some embodiments, KES receiver 212 may be a component within body controller module 214.

In some embodiments, body controller module 214 includes a command processor 216 that determines whether the unlock code is verified. Body controller module 214 may implement a code generation algorithm corresponding to the algorithm implemented by processor 206 of keyless entry remote 202, as described above. Upon verifying the unlock code, command processor 216 may generate and transmit a keyless entry command (e.g., an unlock command) to one or more door control units 220A-B via vehicle bus 218. For example, the keyless entry command may be in the form of a CAN message if vehicle bus 218 is configured to implement the CAN protocol.

Door control units 220A-B are ECUs that are configured to control and monitor various electronic accessories in the vehicle's doors. In particular, door control units 220A-B can be configured to control respective door actuators 222A-B to lock or unlock respective door locks 224A-B. In some embodiments, one door control unit (e.g., door control unit 220A) may be configured to control a plurality of door actuators 222A-B to unlock or lock multiple doors. Door actuators 222A-B may include motorized components that are actuated to lock or unlock respective door locks 224A-B.

In some embodiments, door control units 220A-B may be configured to monitor vehicle bus 218 for a keyless entry command generated by body controller module 214. In some embodiments, door control units 220A-B may be configured to determine whether a message, such as the keyless entry command, is complete and free of errors before controlling respective door actuators 222A-B to unlock one or more doors of the vehicle.

In some embodiments, to enhance the security of KES 210, authentication device 230 can be configured to require a second method of authentication (in addition to receipt of a verified unlock command) to be satisfied before allowing KES 210 to unlock the one or more doors. As shown in system 200, authentication device 230 can be a device (e.g., an ECU) coupled to vehicle bus 218. For example, authentication device 230 may be implemented by a manufacturer of the vehicle and embedded within KES 210 during its original assembly or added on at some other post production time. In some embodiments, authentication device 230 may be powered by the same battery that powers the other ECUs such as body controller module 214 and door control units 220A-B. In some embodiments, authentication device 230 may be configured to be powered by a separate power source, e.g., a separate battery, directly connected to authentication device 230.

In some embodiments, authentication device 230 can be implemented as a component within body controller module 214. For example, the functionality of authentication device 230 may be implemented as software, hardware, or a combination thereof running on body controller module 214.

In some embodiments, authentication device 230 can be employed in system 200 as a separate, smaller form factor computer (e.g., a dongle) connectable with an OBD-II diagnostic port 219 of the vehicle. Authentication device 230 may be configured to be housed in the form factor of a small plug that fits into OBD-II diagnostic port 219. OBD-II diagnostic port 219 may be a socket located under the dashboard on the driver's side of the vehicle. OBD-II diagnostic port 219 is coupled to vehicle bus 218 and allows a coupled authentication device 230 to intercept commands (e.g., an unlock command) generated by body controller module 214 and to inject other commands to suppress door control units 220A-B from operating door actuators 222A-B.

In some embodiments, to suppress KES 210 from unlocking one or more doors until one or more other method of authentication are satisfied, authentication device 230 can be configured to include wireless interface 232, command detector 234, authentication component 238, and command generator 236.

In some embodiments, command detector 234 can be configured to monitor vehicle bus 218 to determine whether a keyless entry command is being transmitted by body controller module 214. For example, the keyless entry command may be an unlock command capable of being executed by one or more door control units 220A-B. Upon detecting the keyless entry command, command detector 234 may notify command generator 236. In some embodiments, command detector 234 may be configured to detect and suppress other types of keyless commands, such as a command initiated by keyless entry remote 202 to start the engines of the vehicle.

In some embodiments, command generator 236 can be configured to suppress the keyless entry command from being successfully processed by door control units 220A-B until a second method of authentication is satisfied. In some embodiments, command generator 236 requires that a plurality of authentication methods be satisfied. In some embodiments, command generator 236 may query authentication component 238 to determine whether the second method of authentication is satisfied.

In some embodiments, command generator 236 can be configured to suppress the unlock command on vehicle bus 218 by generating a command recognizable by door control units 220A-B to disregard the unlock command. For example, command generator 236 may be configured to generate and transmit a lock command on vehicle bus 218 to interrupt the capability of door control units 220A-B to process the previous unlock command. In some embodiments, the lock command has a higher priority than the unlock command and would cause door control units 220A-B to disregard any previously received unlock commands.

In some embodiments, command generator 236 can be configured to suppress the unlock command on vehicle bus 218 on a bit level by triggering an error on vehicle bus 218 to prevent door control units 220A-B from successfully receiving and processing an unlock command. For example, when vehicle bus 218 is configured to operate according to the CAN protocol, command generator 236 can be configured to suppress the unlock command by transmitting a predetermined sequence of bits. In some embodiments, the predetermined sequence of bits may include a predetermined number of consecutive dominant bits. In some embodiments, command generator 236 can be configured to transmit the predetermined sequence of bits during a data length code (DLC) field of a CAN message or frame being transmitted on vehicle bus 218. According to the CAN protocol, door control units 220A-B would trigger an error and halt processing of all commands including any unlock commands. In some embodiments, command generator 236 may implement other CAN frame override mechanisms as disclosed by U.S. patent application Ser. No. 15/719,071, filed on Sep. 28, 2017, whose disclosure is hereby incorporated by reference in its entirety.

In some embodiments, command generator 236 can be configured to suppress the unlock command by implementing and controlling one or more electronic switches added in-between the KES receiver 212 and door actuators 222A-B. The one or more electronic switches can be controlled by command generator 236 to deny communication attempting to pass through to door actuators 222A-B until one or more additional authentication methods are satisfied.

For example, the electronic switches may be implemented between door control units 220A-B and vehicle bus 218. In this example, command generator 236 can be configured to control the electronic switches to physically disconnect door control units 220A-B from vehicle bus 218 to prevent door control units 220A-B from successfully processing an unlock command being transmitted on vehicle bus 218.

In another example, the electronic switches may be implemented between door control units 220A-B and respective door actuators 222A-B. In this example, command generator 236 can be configured to control the electronic switches to physically disconnect door actuators 222A-B from door control units 220A-B to prevent door actuators 222A-B from unlocking respective door locks 224A-B.

In some embodiments, command generator 236 can be configured to suppress the unlock command by implementing and controlling one or more electronic switches added in-between one or more components of KES 210 and a power source. For example, command generator 236 can be configured to physically disconnect, e.g., door control units 220A-B from the power source (e.g., a vehicle battery). Upon being disconnected from the power source, door control units 220A-B may shut down and be prevented from executing the unlock command being transmitted on vehicle bus 218.

In some embodiments where authentication device 230 (or the functionality thereof) is implemented within body controller module 216, authentication device 230 can prevent command processor 216 from transmitting the unlock command on vehicle bus 218 in the first place.

In some embodiments, authentication component 238 can be configured to implement one or more authentication methods that need to be satisfied before KES 210 is permitted to unlock one or more door locks 224A-B to grant entry of the user of keyless entry remote 202 into the vehicle. In some embodiments, authentication component 238 can be configured to query one or more separate devices, such as device 240, to provide one or more additional pieces of authentication information. For example, device 240 may be a smartphone (e.g., mobile device 110 of FIG. 1) or a server (e.g., computing device 130 of FIG. 1.) In some embodiments, authentication component 238 can initiate two-way communication with device 240 through wireless interface 232. Wireless interface 232 may include one or more wireless chips capable of operating with one or more wireless communication protocols such as, without limitation, WiFi, Zigbee, LTE, 3G, Bluetooth, or the like.

In some embodiments, authentication component 238 can be configured to communicate with device 240 to request a user of device 240 provide first authentication information. In some embodiments, authentication component 238 can be configured to compare the first authentication information from device 240 with stored authentication information to determine whether the keyless entry command transmitted by keyless entry remote 202 should be granted.

In some embodiments, authentication component 238 may request the user of device 240 to provide first and second authentication information that is verified against the stored authentication information. In some embodiments, the first and second authentication information correspond to two different types of authentication mechanisms, as described above with respect to multi-factor authentication.

In some embodiments, upon verifying one or more authentication information received from one or more devices 240 against stored authentication information, authentication component 238 can be configured to notify command generator 236. At this point, command generator 236 can be configured to permit door control units 220A-B to process unlock commands to unlock door locks 224A-B. The way in which command generator 236 permits the unlock commands depends on how the unlock commands are being suppressed. For example, if command generator 236 is configured to transmit a lock command to suppress an unlock command, command generator 236 may instead stop transmitting the lock command. In another example, if command generator 236 is configured to transmit bit-wise information to suppress the unlock command, command generator 236 may instead stop transmitting the bit-wise information. In another example, if command generator 236 is configured to control one or more electronic switches to disconnect, e.g., door actuator 222A-B, from door control unit 220A-B, command generator 236 may instead reconnect such connections.

In some embodiments, the authentication information requested by authentication component 238 may include whether device 240 is within proximity to connect and authenticate with authentication device 230. In these embodiments, authentication component may ping for and receive an indication of a presence of device 240 when device 240 is within a certain physical distance.

In some embodiments, device 240 can be configured to include an input interface 242 and a wireless interface 244. In some embodiments, wireless interface 244 may include one or more wireless network chips to enable two-way communication with authentication device 230. For example, wireless interface 244 may implement one or more wireless communication protocols such as WiFi, Bluetooth, LTE, 3G, etc.

In some embodiments, device 240 may receive a request from authentication device 230 to provide one or more requested pieces of authentication information. For example, device 240 may be requested to provide a password, a confirmation command to unlock one or more doors, a fingerprint, an eye scan, etc. The user of device 230 may input the one or more requested pieces of authentication information via input interface 242. For example, input interface 242 may include a user interface displayed on a screen of device 240. Once the user inputs the requested authentication information, wireless interface 244 may be configured to transmit the user's input to authentication device 230.

FIGS. 3A-B illustrate diagrams 300A-B that show how proximity information can be used as authentication information, according to some embodiments. Diagrams 300A-B show authentication devices 302A-B, within respective vehicles 301A-B, that pings for a presence of a designated device within respective wireless communication ranges 306A-B. Authentication devices 302A-B and devices 304A-B may correspond to authentication device 230 and device 240, as described with respect to FIG. 2.

As shown in diagram 300A, authentication device 302A transmits a radio signal 308 that is not receivable by device 304A that is physically outside communication range 306A. In contrast, as shown in diagram 300B, a radio signal 310 transmitted by authentication device 302B is received by device 304B within communication range 306B. Upon receiving radio signal 310, device 304B may be configured to transmit a separate notification signal 312 back to authentication device 302B to indicate receipt of radio signal 310. The notification signal 312 may itself by a type of authentication information that indicates an authorized user possesses device 304B.

FIG. 4 illustrates a method 400 for vehicle authentication, according to some embodiments. In some embodiments, method 400 can be performed by an authentication device such as authentication device 122 of FIG. 1 or authentication device 230 of FIG. 2 to enhance the security of a keyless entry system in a vehicle. For ease of explanation, one or more steps of method 400 may be described in reference to the components of FIGS. 1 and 2.

In step 402, the authentication device receives a keyless entry command on a vehicle bus of the vehicle. In some embodiments, authentication device can be configured to monitor messages on the vehicle bus to determine whether the keyless entry command is being transmitted on the vehicle bus. For example, the keyless entry command may be a command to unlock various components of the vehicle such as one or more doors, the trunk, the hood, etc.

In some embodiments, the keyless entry command may be associated with a keyless entry attempt initiated by a keyless entry remote (e.g., keyless entry remote 102 of FIG. 1). In particular, an Electronic Control Unit (ECU), e.g., a body control module, may receive a wireless signal transmitted by the keyless entry remote. Upon verifying an unlock code represented by the wireless signal, the ECU may be configured to generate and transmit the keyless entry command onto the vehicle bus to control one or more door control units to unlock one or more doors of the vehicle.

In step 404, upon receiving the keyless entry command, the authentication device suppresses the keyless entry command to prevent the keyless entry system from executing the keyless entry command. Various suppression methods are described above with respect to FIG. 2. For example, the authentication device may be configured to suppress the keyless entry command by transmitting a lock command on the vehicle bus.

In step 406, the authentication device receives authentication information from a separate device. In some embodiments, the authentication information is wirelessly received. In some embodiments, the authentication device can be configured to query the separate device to provide the authentication information. For example, the separate device may be a remote device not physically coupled to the vehicle such as mobile device 110 or computing device 130, as described with respect to FIG. 1.

In some embodiments, the authentication device requests first and second authentication information from the separate device. For example, the first and second authentication information may correspond to two different factors of multi-factor authentication. In some embodiments, the authentication device requests first authentication information from a first separate device and second authentication information from a second separate device.

As discussed above with respect to FIG. 2, the authentication information requested may depend on the type of authentication mechanism or protocol being implemented. For example, an authentication mechanism may include proximity (e.g., noting the proximity of a previously registered BT paired device), in which case the authentication information may be a signal noting the proximity. In another example, an authentication mechanism may be a simple acknowledgement through an affirmation on an application hosted on a mobile device (i.e., the separate device), in which case the authentication information may be the simple acknowledgement. In another example, an authentication mechanism may be one of the factors of multi-factor authentication (such as challenge response with a secret pin/password). This type of authentication mechanism may allow an owner of the vehicle to set up authentication for another operator.

In step 408, the authentication device verifies the authentication information against stored information. In some embodiments, if the authentication device receives a plurality of authentication information from one or more separate devices, the authentication device can be configured to compare each piece of authentication information against a corresponding piece of stored information.

In some embodiments, the stored information include specific data that received authentication information must match before the authentication device permits keyless entry commands to be executed, as discussed below. The stored information may be data encrypted in a memory of authentication device. In some embodiments, the type of information being stored depends on the type of authentication information that the authentication device is configured to verify. For example, the stored information may be a specific pin number if the authentication device is configured to verify authentication information including pin numbers. Accordingly, the stored information may include a plurality of types of data corresponding to a plurality of authentication methods if the authentication device is configured to verify the plurality of authentication methods.

In step 410, the authentication device determines whether the received authentication information is verified. If the authentication information is verified, method 400 proceeds to step 412. Otherwise, method 400 proceeds to step 404 in which the authentication device continues to suppress the keyless entry command.

In step 412, the authentication device permits the keyless entry command to be executed by the keyless entry system. In some embodiments, permitting the keyless entry command to be executed can include stopping the suppressing action and allowing the keyless entry command of step 402 to be communicated fully to the keyless entry command. In some embodiments, permitting the keyless entry command to be executed can include controlling one or more electronic switches to reconnect one or more components of the keyless entry system. For example, the authentication device may be configured to physically reconnect one or more door actuators or door control units to a power source (e.g., a vehicle battery). In another example, the authentication device may be configured to physically reconnect one or more door control units to corresponding door actuators to enable the one or more door control units to unlock one or more doors.

FIG. 5 illustrates an example of a computing device in accordance with one embodiment. Device 500 can be a component of a system for enhancing security of a keyless entry system according to the systems and method described above or can include the entire system itself. For example, device 500 may implement some or all of the functionality of authentication device 122, as described with respect to FIG. 1, or authentication device 230, as described with respect to FIG. 2. In some embodiments, device 500 is configured to execute a method for enhancing security of a keyless entry system, such as method 400 described with respect to FIG. 4.

Device 500 can be a host computer connected to a network. Device 500 can be a client computer or a server. As shown in FIG. 5, device 500 can be any suitable type of microprocessor-based device, such as a personal computer, work station, server, or handheld computing device (portable electronic device) such as a phone or tablet. The device can include, for example, one or more of processor 510, input device 520, output device 530, storage 540, and communication device 560. Input device 520 and output device 530 can generally correspond to those described above, and can either be connectable or integrated with the computer.

Input device 520 can be any suitable device that provides input, such as a touchscreen, keyboard or keypad, mouse, or voice-recognition device. Output device 530 can be any suitable device that provides output, such as a touchscreen, haptics device, or speaker.

Storage 540 can be any suitable device that provides storage, such as an electrical, magnetic, or optical memory including a RAM, cache, hard drive, or removable storage disk. Communication device 560 can include any suitable device capable of transmitting and receiving signals over a network, such as a network interface chip or device. The components of the computer can be connected in any suitable manner, such as via a physical bus, or wirelessly. Storage 540 can be a non-transitory computer-readable storage medium comprising one or more programs, which, when executed by one or more processors, such as processor 510, cause the one or more processors to execute method 400 of FIG. 4.

Software 550, which can be stored in storage 540 and executed by processor 510, can include, for example, the programming that embodies the functionality of the present disclosure (e.g., as embodied in the devices described above).

Software 550 can also be stored and/or transported within any non-transitory, computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 540, that can contain or store programming for use by or in connection with an instruction-execution system, apparatus, or device.

Software 550 can also be propagated within any transport medium for use by or in connection with an instruction-execution system, apparatus, or device, such as those described above, that can fetch instructions associated with the software from the instruction-execution system, apparatus, or device and execute the instructions. In the context of this disclosure, a transport medium can be any medium that can communicate, propagate, or transport programming for use by or in connection with an instruction-execution system, apparatus, or device. The transport readable medium can include, but is not limited to, an electronic, magnetic, optical, electromagnetic, or infrared wired or wireless propagation medium.

Device 500 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 500 can implement any operating system suitable for operating on the network. Software 550 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has made reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments, with various modifications, that are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. In the foregoing description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the foregoing description may use terms first, second, etc. to describe various elements, these elements should not be limited by the terms. These terms are only used to distinguish one element from another. For example, a first authentication information could be termed a second authentication information, and vice versa, without departing from the scope of the various described embodiments.

In addition, it is also to be understood that the singular forms "a," "an," and "the" used in the foregoing description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, a non-transitory computer readable storage medium stores one or more programs configured to be executed by one or more processors of an electronic device, the one or more programs including instructions for implementing any of the steps described or claimed herein. The present disclosure also relates to a device for performing the operations herein. This device may be specially constructed for the required purposes (e.g., an application specific integrated circuit (ASIC)), or it may include a general purpose computer selectively activated or reconfigured by a computer program stored in the computer. Such a computer program may be stored in a non-transitory, computer readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description above. In addition, the present disclosure is not described with reference to any particular programming language. It will be appreciated that a variety of programming languages may be used to implement the teachings of the present disclosure as described herein.

What is claimed is:

1. A method for enhancing security of a keyless entry system of a vehicle, comprising:
monitoring, at a first device, a vehicle bus of the keyless entry system to determine that a keyless entry command is being transmitted, the keyless entry command executable by the keyless entry system;

upon determining that the keyless entry command is being transmitted on the vehicle bus, suppressing the keyless entry command on the vehicle bus to prevent the keyless entry system from executing the keyless entry command;

receiving authentication information from a second device; and upon verifying the authentication information against stored information, permitting the keyless entry system to execute the keyless entry command.

2. The method of claim 1, further comprising:
querying the second device to provide the authentication information.

3. The method of claim 1, wherein suppressing the keyless entry command comprises:
transmitting a message on the vehicle bus to prevent the keyless entry system from successfully processing the keyless entry command, wherein the message conforms to a communication protocol of the vehicle bus.

4. The method of claim 1, wherein suppressing the keyless entry command comprises:
transmitting a message on the vehicle bus to trigger an error in the keyless entry system to prevent the keyless entry system from successfully processing the keyless entry command.

5. The method of claim 1, wherein the keyless entry system is configured to control one or more doors, and wherein the keyless entry command comprises a command to unlock the one or more doors.

6. The method of claim 5, wherein suppressing the keyless entry command comprises:
transmitting a message on the vehicle bus to lock the one or more doors to prevent the keyless entry system from successfully processing the keyless entry command.

7. The method of claim 5, wherein suppressing the keyless entry command comprises:
controlling an electronic switch to disconnect the one or more doors from the keyless entry system to prevent the keyless entry system from successfully processing the keyless entry command.

8. The method of claim 1, wherein the first device comprises an Electronic Control Unit (ECU) in the keyless entry system.

9. The method of claim 1, wherein the first device is configured to be connected to an on-board diagnostic (OBD) port of a vehicle.

10. The method of claim 1, wherein the authentication information is received over a Bluetooth wireless communications channel.

11. The method of claim 1, wherein the authentication information is received over a WiFi communications channel.

12. The method of claim 1, wherein the authentication information is received over a cellular communications channel.

13. The method of claim 1, wherein the authentication information provides a notification that the second device is located proximally to the vehicle configured with the keyless entry system.

14. The method of claim 1, wherein the authentication information comprises first authentication information received from the second device, further comprising:
receiving second authentication information from a third device;

verifying the first authentication and the second authentication against stored authentication information; and upon verifying the first and the second authentication information, permitting the keyless entry system to execute the keyless entry command.

15. A system for enhancing security of a keyless entry system of a vehicle, comprising: a first device comprising one or more processors; and memory storing instructions executable by the one or more processors to cause:

monitoring, at the first device, a vehicle bus of the keyless entry system to determine that a keyless entry command is being transmitted, the keyless entry command executable by the keyless entry system;

upon determining that the keyless entry command is being transmitted on the vehicle bus, suppressing the keyless entry command on the vehicle bus to prevent the keyless entry system from executing the keyless entry command;

receiving authentication information from a second device; and upon verifying the authentication information against stored information, permitting the keyless entry system to execute the keyless entry command.

16. The system of claim 15, wherein the instructions are further executable by the one or more processors to cause:
querying the second device to provide the authentication information.

17. The system of claim 15, wherein the instructions are further executable by the one or more processors to cause suppressing the keyless entry command by:
transmitting a message on the vehicle bus to prevent the keyless entry system from successfully processing the keyless entry command, wherein the message conforms to a communication protocol of the vehicle bus.

18. The system of claim 15, wherein the instructions are further executable by the one or more processors to cause suppressing the keyless entry command by:
transmitting a message on the vehicle bus to trigger an error in the keyless entry system to prevent the keyless entry system from successfully processing the keyless entry command.

19. The system of claim 15, wherein the keyless entry system is configured to control one or more doors, and wherein the keyless entry command comprises a command to unlock the one or more doors.

20. The system of claim 19, wherein the instructions are further executable by the one or more processors to cause suppressing the keyless entry command by:
transmitting a message on the vehicle bus to lock the one or more doors to prevent the keyless entry system from successfully processing the keyless entry command.

21. The system of claim 19, wherein the instructions are further executable by the one or more processors to cause suppressing the keyless entry command by:
controlling an electronic switch to disconnect the one or more doors from the keyless entry system to prevent the keyless entry system from successfully processing the keyless entry command.

22. The system of claim 15, wherein the first device comprises an Electronic Control Unit (ECU) in the keyless entry system.

23. The system of claim 15, wherein the first device is configured to be connected to an on-board diagnostic (OBD) port of a vehicle.

24. The system of claim 15, wherein the authentication information is received over a Bluetooth wireless communications channel.

25. The system of claim 15, wherein the authentication information is received over a WiFi communications channel.

26. The system of claim 15, wherein the authentication information is received over a cellular communications channel.

27. The system of claim 15, wherein the authentication information provides a notification that the second device is located proximally to the vehicle configured with the keyless entry system.

28. The system of claim 15, wherein the authentication information comprises first authentication information received from the second device, and wherein the instructions are further executable by the one or more processors to cause:
   receiving second authentication information from a third device;
   verifying the first authentication and the second authentication against stored authentication information; and
   upon verifying the first and the second authentication information, permitting the keyless entry system to execute the keyless entry command.

29. A non-transitory computer-readable storage medium comprising instructions for enhancing security of a keyless entry system of a vehicle, wherein the instructions, when executed by a first device having one or more processors, cause the one or more processors to perform instructions comprising:
   monitoring, at a first device, a vehicle bus of the keyless entry system to determine that a keyless entry command is being transmitted, the keyless entry command executable by the keyless entry system;
   upon determining that the keyless entry command is being transmitted on the vehicle bus, suppressing the keyless entry command on the vehicle bus to prevent the keyless entry system from executing the keyless entry command;
   receiving authentication information from a second device; and
   upon verifying the authentication information against stored information, permitting the keyless entry system to execute the keyless entry command.

* * * * *